United States Patent
Hakura et al.

(10) Patent No.: US 8,947,444 B1
(45) Date of Patent: Feb. 3, 2015

(54) DISTRIBUTED VERTEX ATTRIBUTE FETCH

(75) Inventors: Ziyad S. Hakura, Mountain View, CA (US); Emmett M. Kilgariff, San Jose, CA (US); Michael C. Shebanow, Saratoga, CA (US); James C. Bowman, Pescadero, CA (US); Philip Browning Johnson, Campbell, CA (US); Johnny S. Rhoades, Durham, NC (US); Rohit Gupta, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1045 days.

(21) Appl. No.: 12/331,307

(22) Filed: Dec. 9, 2008

(51) Int. Cl.
*G06T 1/00* (2006.01)

(52) U.S. Cl.
USPC .................................................. 345/522

(58) Field of Classification Search
CPC ............ G09G 2360/06; G06T 15/005; G06T 2210/52; G06F 12/0811
USPC ......................................... 345/522, 502, 506
See application file for complete search history.

(56) References Cited

U.S. PATENT DOCUMENTS

| | | | |
|---|---|---|---|
| 5,086,495 A * | 2/1992 | Gray et al. ..................... | 345/420 |
| 2007/0159488 A1* | 7/2007 | Danskin et al. ............... | 345/505 |
| 2009/0033672 A1* | 2/2009 | Jiao et al. ...................... | 345/559 |
| 2009/0073163 A1* | 3/2009 | Min et al. ...................... | 345/419 |
| 2009/0182944 A1* | 7/2009 | Comparan et al. ............ | 711/122 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Kee M Tung
*Assistant Examiner* — Peter Hoang
(74) *Attorney, Agent, or Firm* — Patterson & Sheridan, LLP (57) ABSTRACT

A data structure that includes pointers to vertex attributes and primitive descriptions is generated and then processed within a general processing cluster. The general processing cluster includes a vertex attribute fetch unit that fetches from memory vertex attributes corresponding to the vertices defined by the primitive descriptions.

24 Claims, 9 Drawing Sheets

DISTRIBUTED VERTEX ATTRIBUTE FETCH

BACKGROUND OF THE INVENTION

1. Field of the Invention

Embodiments of the present invention relate generally to computer hardware and more specifically to distributed vertex attribute fetch.

2. Description of the Related Art

The processing power of a modern central processing unit (CPU) may be supplemented using a co-processor, such as a graphics processing unit (GPU). Oftentimes, the GPU is used as a co-processor configured to process graphics data to generate pixels that are displayed on a screen.

Graphics data typically includes a plurality of vertices, where each vertex is a single data point in a three-dimensional (3D) model. Each vertex is defined by a set of attributes that describe the position and color of the vertex, among other things. Graphics data also typically includes a plurality of "primitive descriptions." A primitive description identifies a set of vertices that represents a particular geometric shape. For example, a primitive description may identify three different vertices. Each vertex may represent different corners of one triangle. Other geometric shapes may also be represented by primitive descriptions. The geometric shape described by a primitive description is known as a "graphics primitive." The GPU identifies the pixels associated with each graphics primitive and colorizes these pixels according to the vertices and the vertex attributes associated with the graphics primitive.

Vertices and graphics primitives are stored in memory within a vertex array and an index array. Each entry of the vertex array includes vertex attributes associated with the vertex. Each entry of the index array includes an index that points to an entry in the vertex array. The index array is organized so that sets of indices represent primitive descriptions. The GPU accesses the vertices and the primitive descriptions that are stored in the vertex array and the index array, respectively, and processes this data using a sequence of different processing components.

Figure 1:
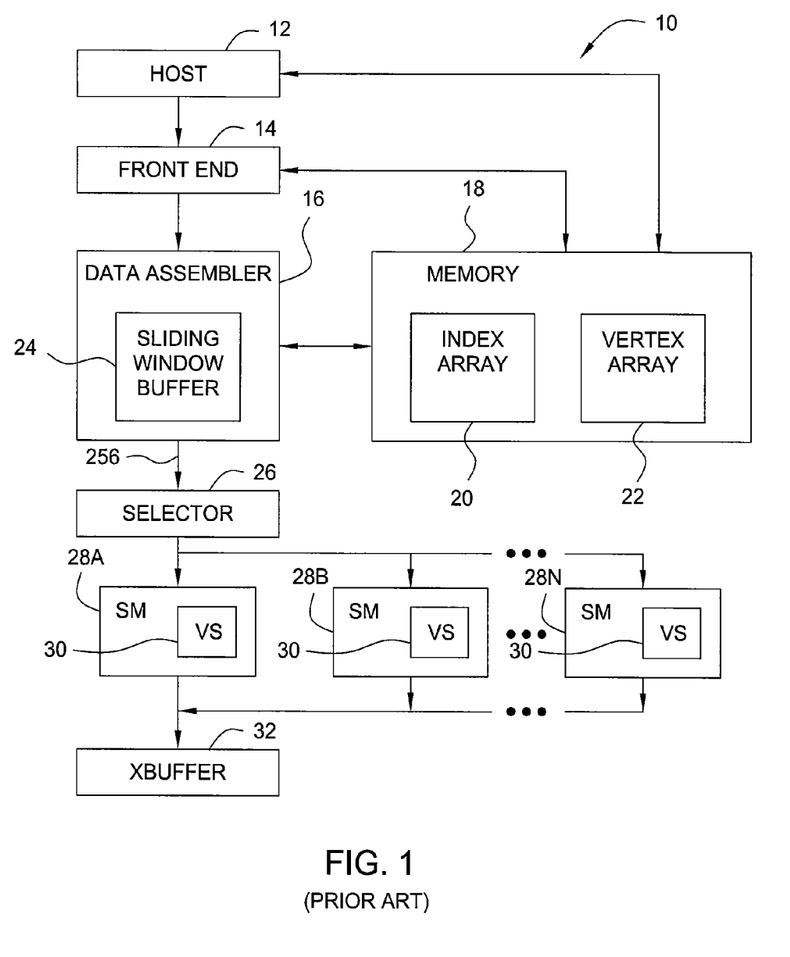
FIG. 1 is a prior art graphics processing pipeline.

The components of the GPU that process the graphics data are collectively known as a "graphics processing pipeline." A portion of a prior art graphics processing pipeline 10 is illustrated in FIG. 1. As shown, the graphics processing pipeline 10 includes a host 12, a front end 14, a data assembler 16, and a memory 18. Indices are stored in an index array 20 and vertices are stored in a vertex array 22 that are each located within memory 18. Each entry of vertex array 22 includes one or more attributes of a particular size. For example, each entry of vertex array 22 may include 8 attributes, where each attribute has a size of 4 bytes, and each vertex occupies 32 bytes of memory 18.

Data assembler 16 reads indices from the index array 20. Data assembler 16 then loads some or all of these indices into a sliding window buffer 24 located within data assembler 16. Data assembler 16 loads a particular index into sliding window buffer 24 when the index is not already stored in sliding window buffer 24. Accordingly, each index stored in sliding window buffer 24 is unique. When data assembler 16 reads an index from index array 20 that is not stored in sliding window buffer 24, the oldest entry in sliding window buffer 24 is removed to make room for the new entry. When a new entry is added to sliding window buffer 24, data assembler retrieves the vertex associated with the new entry and transmits the vertex attributes associated with the vertex to a selector 26.

Data assembler 16 also identifies primitive descriptions within the indices read from index array 20. Data assembler generates a translated version of each primitive description, where the translated version comprises pointers to locations in sliding window buffer 24. Data assembler 16 transmits each translated primitive description to selector 26.

Selector 26 receives vertex attributes and translated primitive descriptions from data assembler 16 and selects one of a plurality of shader multiprocessors (SMs) 28A-28N to process this data. Selector 26 typically employs a round-robin protocol to distribute data to each SM 28A-28N. Selector 26 transmits a preset amount of graphics data to a particular SM, then selects the next SM in a sequence to receive graphics data. Each SM 28A-28N includes a vertex shader 30 that colorizes pixels associated with vertex attributes and primitive descriptions received from selector 26. When a particular SM completes graphics data processing, the processed graphics data is output to an xbuffer 32 that collects data from SMs 28A-28N.

One disadvantage of this configuration is that each unique vertex and the associated vertex attributes are sequentially fetched from memory 18. This may cause a memory access bottleneck when numerous vertices need to be fetched. Another disadvantage is that data assembler 16 must be connected to selector 26 with a 256-bit wide bus so that an entire vertex may be transmitted to selector 26. Transmitting more than one vertex simultaneously to selector 26 would require that the bus size be increased. A further disadvantage is that data assembler 16 must process and transmit a 256 bit block of data each time a unique index is encountered. When numerous unique indices are encountered, the processing requirements of the data assembler 16 increase significantly.

Accordingly, there remains a need in the art for a more efficient way to process graphics data in a graphics processing pipeline.

SUMMARY OF THE INVENTION

Embodiments of the invention provide a method and a system for fetching vertex attributes for graphics processing from within a general processing cluster.

A method for fetching vertex attributes for graphics processing, according to an embodiment of the invention, includes the steps of generating a data structure that includes pointers to vertex attributes and primitive descriptions, and processing the data structure within a general processing cluster to fetch vertex attributes corresponding to vertices defined by the primitive descriptions from memory.

A graphics processing system according to an embodiment of the invention includes a plurality of general processing clusters and a primitive distributor. The primitive distributor generates a data structure that includes pointers to vertex attributes and primitive descriptions. The primitive distributor then distributes the data structure to the general processing clusters. Each general processing cluster includes a shader multiprocessor and a vertex attribute fetch unit. The vertex attribute fetch unit is configured to process the data structure and fetch vertex attributes corresponding to vertices defined by the primitive descriptions from memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 2A:
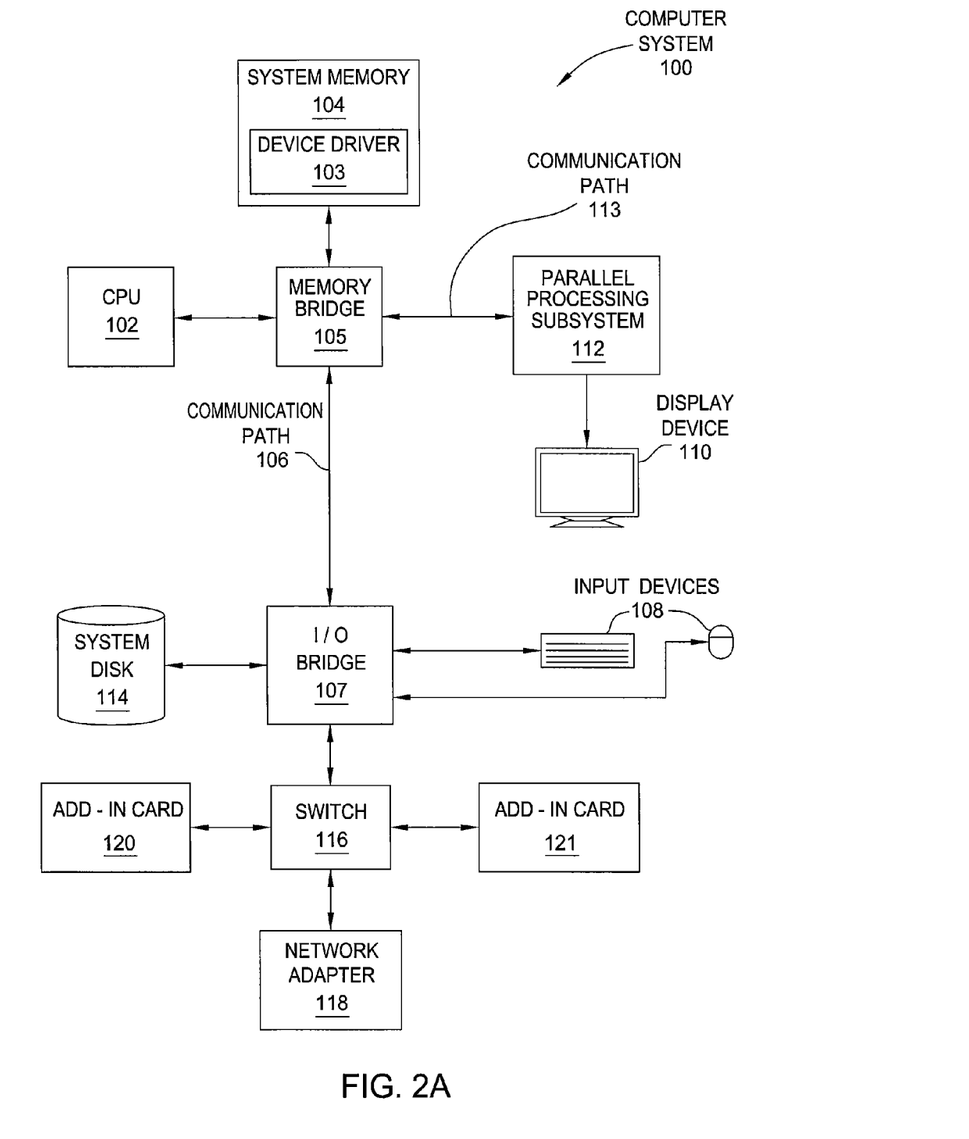
FIG. 2A is a block diagram illustrating a computer system configured to implement one or more aspects of the present invention.

FIG. 2A is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2B:
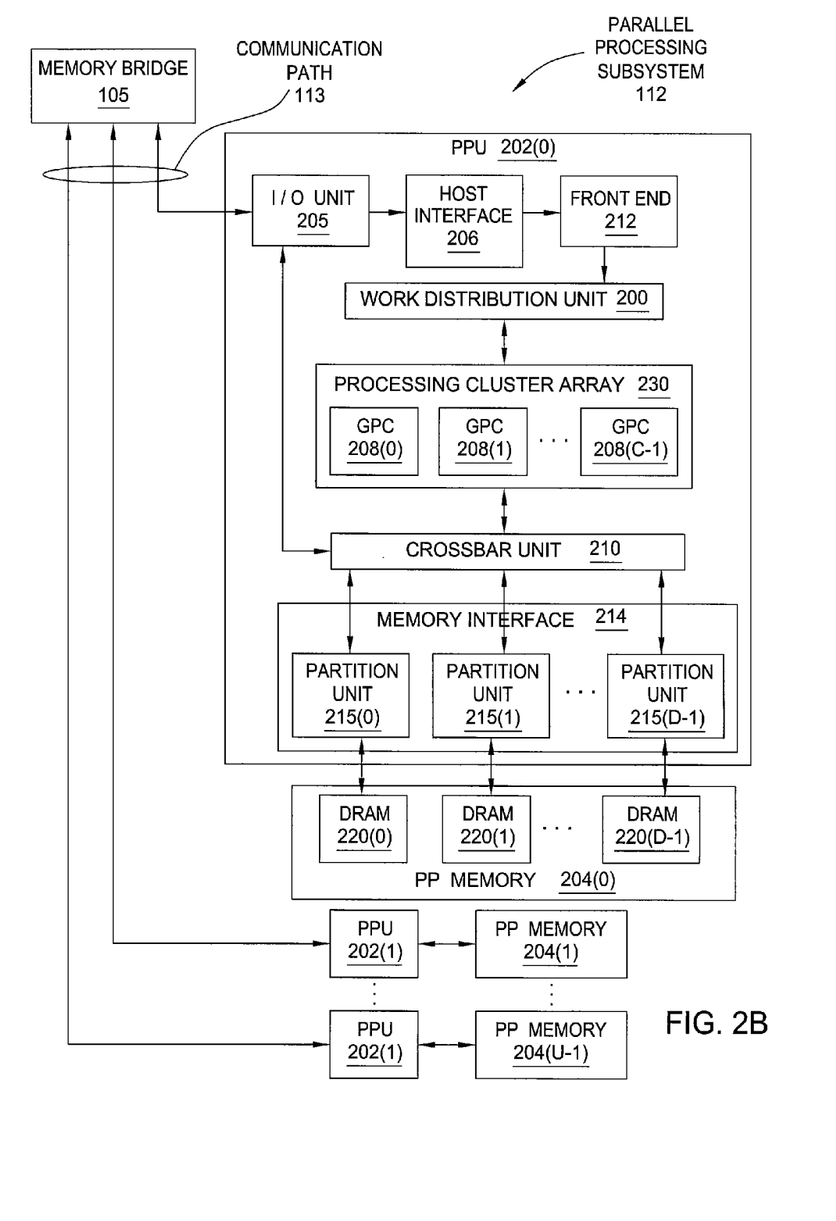
FIG. 2B is a block diagram of a parallel processing subsystem for the computer system of FIG. 2A, according to one embodiment of the present invention.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
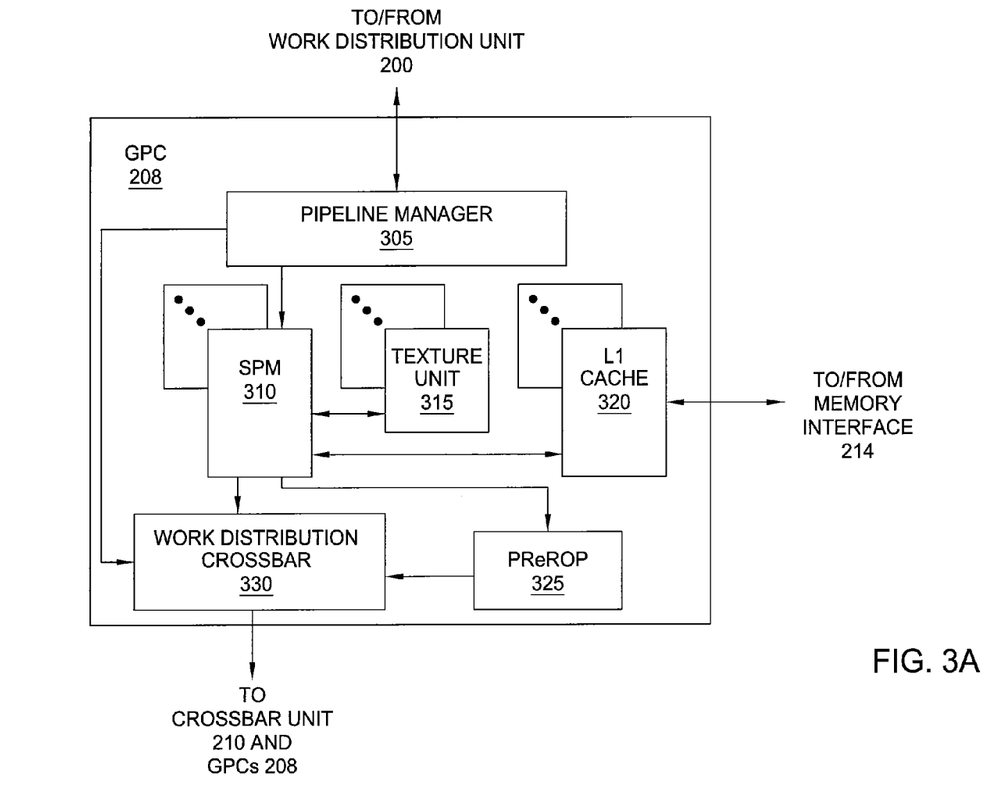
FIG. 3A is a block diagram of a general processing cluster (GPC) within one of the parallel processing units (PPUs) of FIG. 2B, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
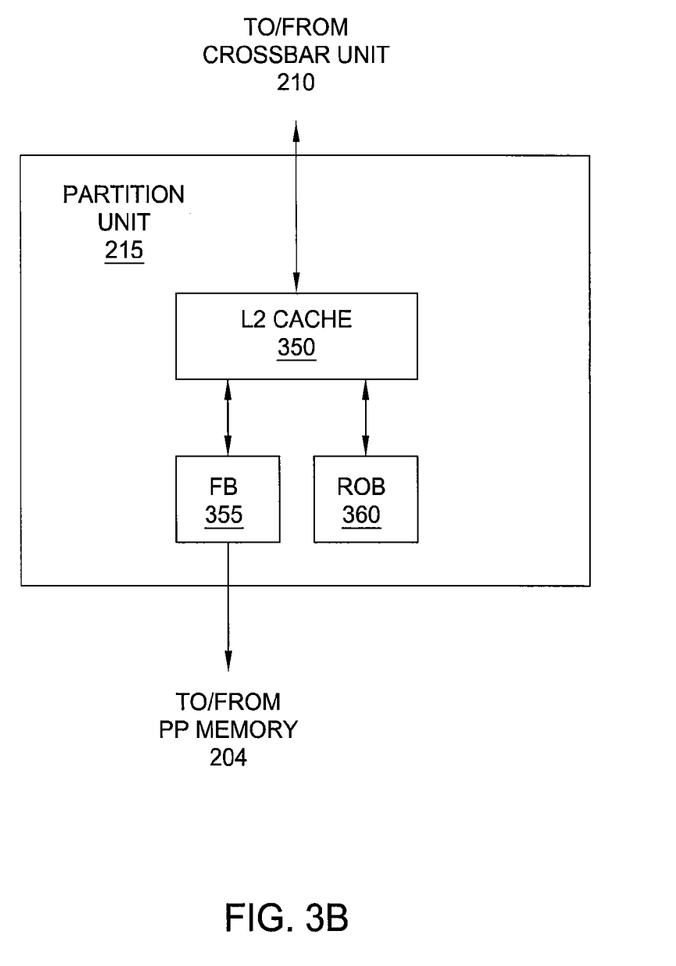
FIG. 3B is a block diagram of a partition unit within one of the PPUs of FIG. 2B, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
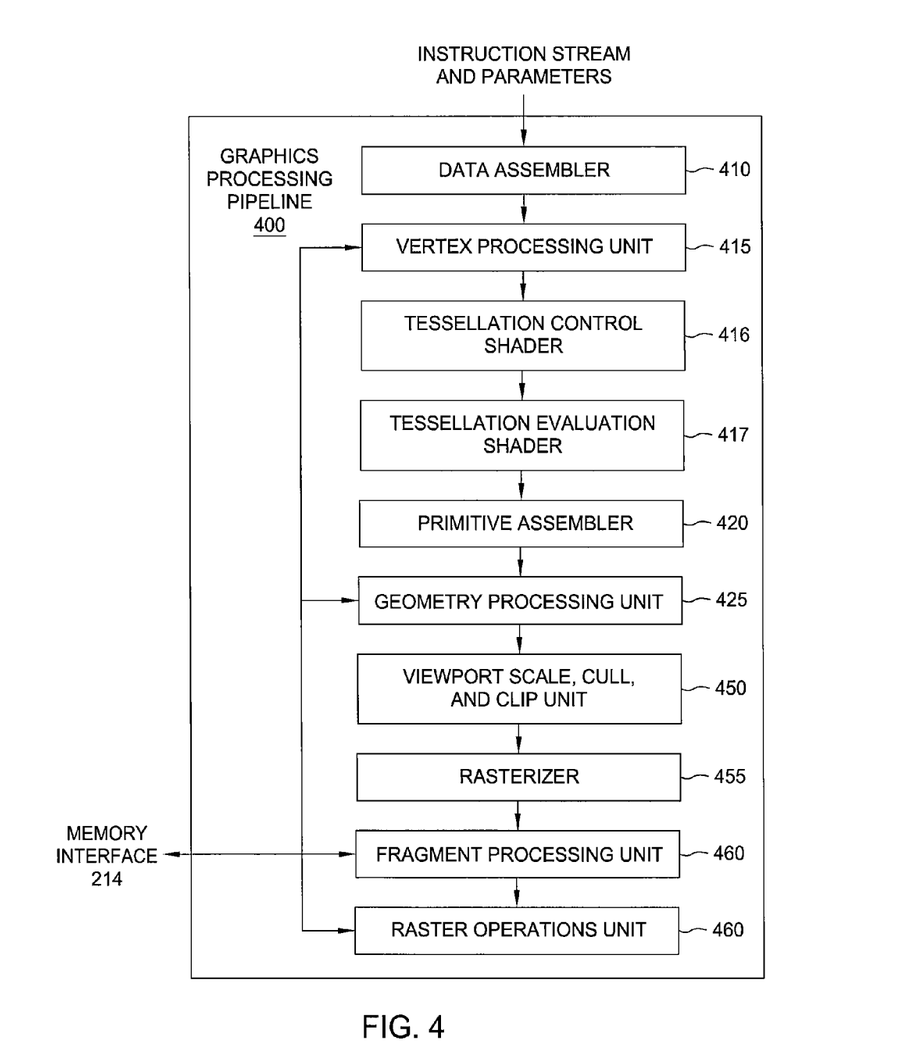
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2B can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

In one embodiment, vertex processing unit 415 transmits vertex data to a tessellation control shader (TCS) 416. TCS 416 is a programmable execution unit that performs a change of basis of a control point, computation of tessellation LODs parameters, or the like, and is executed once for each surface patch described by the received vertex data. TCS 416 transmits processed vertex data to tessellation evaluation shader (TES) 417.

TES 417 is a programmable execution unit that computes a final position and attributes of each vertex based on patch primitive control points, parametric (u,v) position for each vertex, displacement maps, and the like, and is executed once for each output vertex. TES 417 transmits processed vertex data to primitive assembler 420.

Primitive assembler 420 receives vertex attributes from TES 417, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, perspective correction, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Distributed Vertex Attribute Fetch

Figure 5:
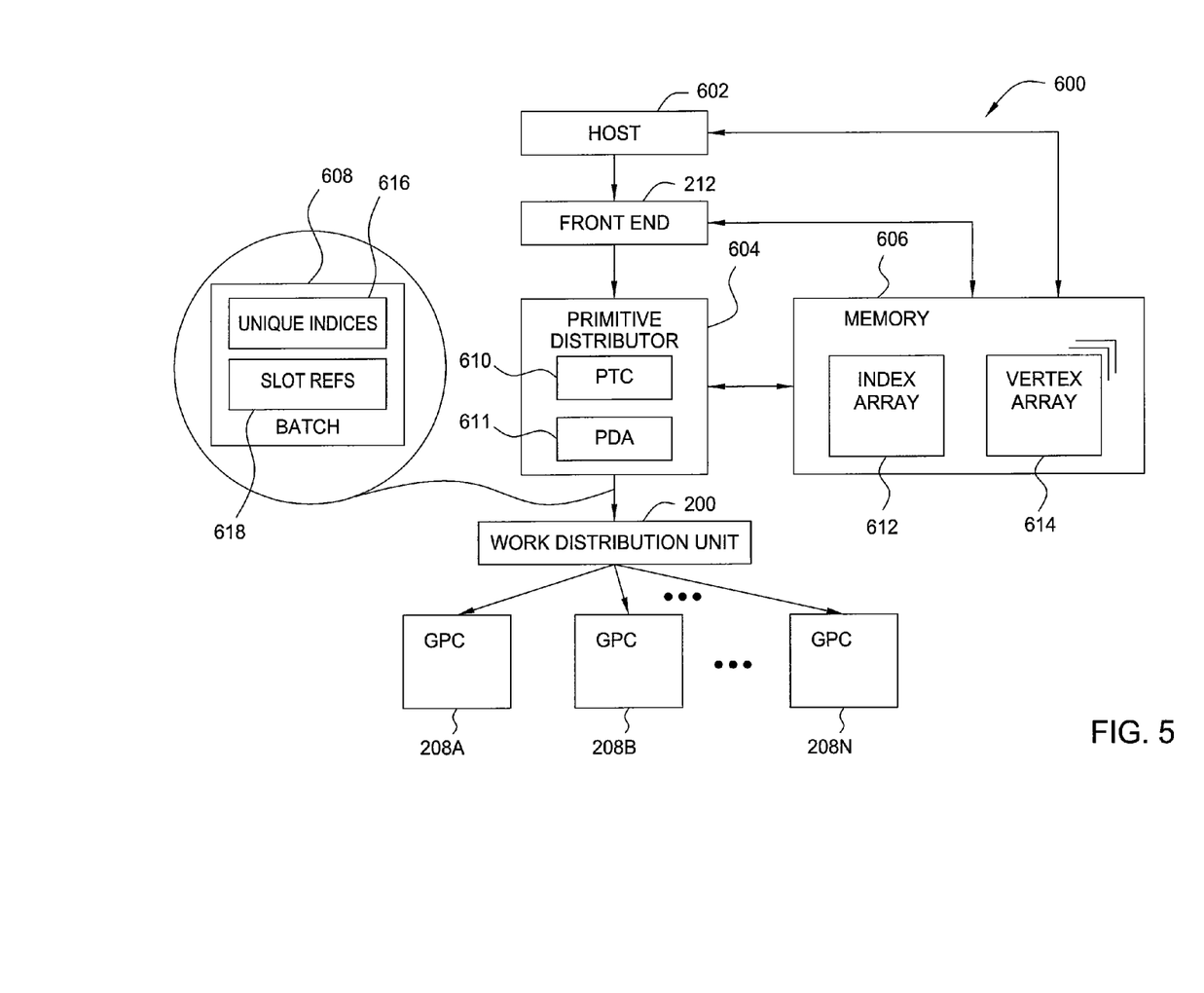
FIG. 5 is a computer system configured to pre-process and distribute graphics data, according to one embodiment of the present invention.

FIG. 5 is a computer system 600 configured to pre-process and distribute graphics data, according to one embodiment of the present invention. As shown, the computer system 600 includes a host 602, front end 212, a primitive distributor (PD) 604, and a memory 606. Host 602, front end 212 and PD 604 cooperate to pre-process graphics data stored in memory 606.

Memory 606 stores graphics data in an index array 612 and one or more vertex arrays 614. Vertex array 614 stores a plurality of vertices, where each vertex is a data point in a three-dimensional (3D) model. A set of vertex attributes defines each vertex and is stored with the vertex in vertex array 614. One example of a vertex attribute is "position." The position attribute defines the position of the vertex. The position attribute may be represented by a position vector that includes x, y and z components. The x, y and z components represent the x, y and z coordinates, respectively, of the vertex in a 3D Cartesian coordinate system.

Index array 612 stores indices that point to vertices in vertex array 614. Index array 612 is organized so that sets of indices describe a particular graphics primitive, such as a triangle or a rectangle. The indices within that set point to vertices associated with the graphics primitive. For example, three indices could represent a triangle, and the vertices pointed to by those three indices define the vertex attributes associated with each corner of the triangle. A particular type of graphics primitive may be encoded in index array 612 using different techniques. For example, the triangle could be encoded by sets of three consecutive indices or, alternatively, by consecutive sets of three indices. In one embodiment, the indices in index array 612 include information that specifies the particular encoding technique used.

When index array 612 is generated, the indices stored therein are organized into groups that provide descriptions of a single type of graphics primitive. These groups are known as "primitive descriptions." Depending on the type of primitive description provided by index array 612, a different one of vertex arrays 614 may be accessed. The indices in index array 612 may be used to determine which vertex array 614 stores the required vertices and, thus, which type of graphics primitive is described by index array 612.

When the computer system 600 pre-processes the graphics data stored in memory 606, PD 604 extracts indices and primitive descriptions from index array 612 according to commands received from host 602 and front end 212. PD 604 loads an index read from index array 612 into a post-transform cache (PTC) 610 when PTC 610 is not full and the index is not already stored in PTC 610. Thus, PTC 610 includes the unique indices that were read from index array 612 by PD 604. PD 604 also records the primitive descriptions encoded by index array 612 in a primitive description array (PDA) 611 as follows. For each index read from index array 615, PD 604 generates a pointer to the location in PTC 610 that corresponds to the index. PD 604 stores each pointer in sequence so that the original ordering of the indices is preserved. Primitive descriptions encoded in index array 612 are thus represented in PDA 611.

When PTC 610 is full and PD 604 reads an index from index array 612 that is not represented in PTC 610, PD 604 generates a batch 608. Batch 608 includes unique indices 616 that are copies of the indices stored in PTC 610. Batch 608 also includes slot refs 618 that are copies of the pointers stored in PDA 611. PD 604 generates batch information (not shown) that specifies the type of graphics primitive described by slot refs 618 and the technique used to encode the primitive descriptions. PD 604 generates batch information using the indices in PTC 610. PD 604 then clears PTC 610.

PD 604 transmits batch 608 and batch information to work distribution unit (WDU) 200. WDU 200 transmits batch 608 and batch information to one of GPCs 208A-208N in round-robin fashion, although other techniques for distributing work may be employed. When one of GPCs 208A-208N receives batch 608 and batch information, that GPC performs graphics processing operations using the data referenced by the contents of batch 608.

Figure 6:
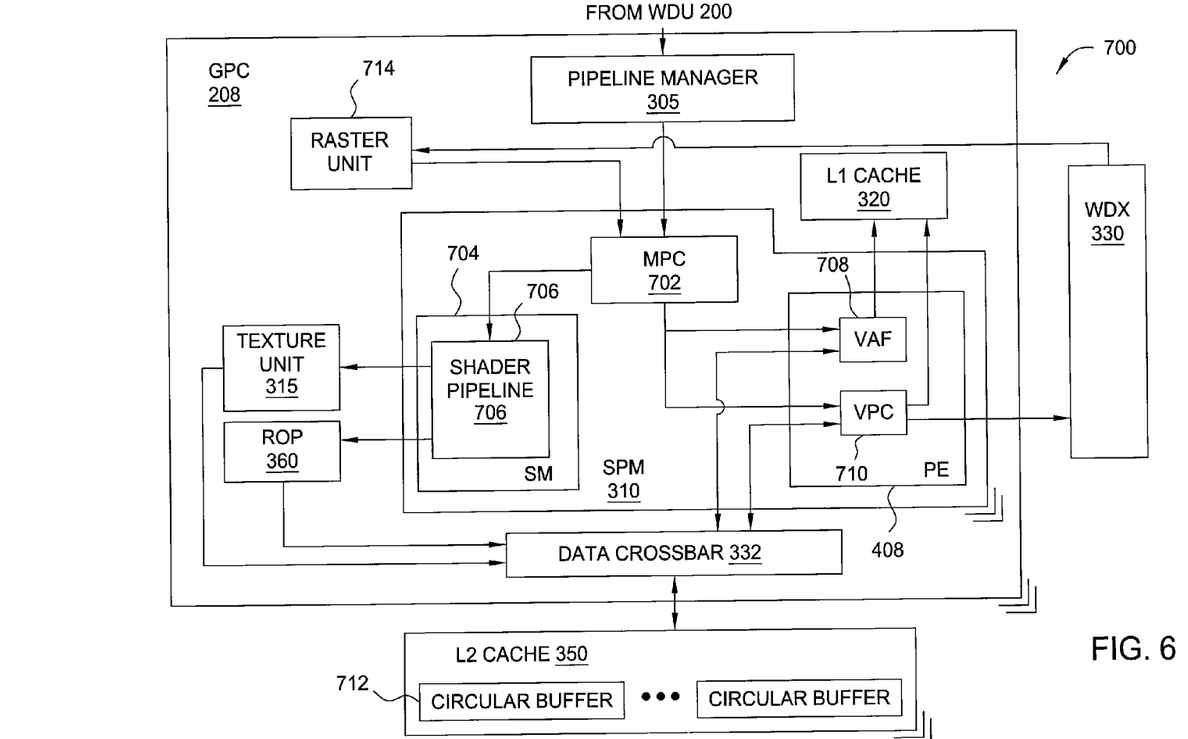
FIG. 6 is a computer system configured to implement a distributed vertex attribute fetch, according to one embodiment of the present invention.

FIG. 6 is a computer system 700 configured to implement a distributed vertex attribute fetch, according to one embodiment of the present invention. As shown, the computer system 700 includes one or more general processing clusters (GPCs) 208, where each GPC 208 includes a plurality of streaming multiprocessors (SPMs) 310. Each SPM 310 includes an Mpipe controller (MPC) 702, a shader multiprocessor (SM) 704, and primitive engine (PE) 408.

Each SPM 310 on a GPC 208 is managed by a pipeline manager 305 that receives batch 608 (not shown here) and batch information from WDU 200. The pipeline manager 305 transmits batch 608 and batch information to one of the MPCs 702 for processing. In one embodiment, the pipeline manager 305 distributes batches and batch information to MPCs 702 in round-robin fashion. MPC 702 receives batch 608 and batch information and determines which type of graphics primitive is described by slot refs 618 and which encoding technique is used to provide the descriptions using the batch information. MPC 702 then configures SM 706 and PE 408 to process the specified type of graphics primitive and to extract the primitive descriptions from slot refs 618 based on the encoding technique. MPC 702 then transmits the batch to PE 408.

PE 408 includes a vertex attribute fetch engine (VAF) 708 and a viewpoint culling engine (VPC) 710. VAF 708 receives batch 608 and parses unique indices 616 (not shown here) and slot refs 618 (not shown here). VAF 708 accesses vertex array 614 (not shown here) via data crossbar (x-bar) 332 and extracts the vertex attributes associated with the vertices referenced by unique indices 616. VAF 708 then generates an inter-stage buffer entry (ISBE) (not shown) that includes the fetched vertex attributes and the primitive descriptions provided by slot refs 618. VAF 708 stores the ISBE in L1 cache 320. VAF 708 then informs MPC 702 that the vertices have been fetched.

Once VAF 708 has finished storing the ISBE, MPC 702 executes a shader pipeline 706 with the data stored in the ISBE. In one embodiment, shader pipeline 706 executes tessellation control shader 416, tessellation evaluation shader 417, and geometry processing unit 425. Once shader pipeline 706 has completed, MPC 702 transmits the output of shader pipeline 706 to VPC 710 for processing.

VPC 710 then generates graphics primitives using the processed vertex attributes and primitive descriptions stored in the ISBE. VPC 710 performs preliminary processing operations on the data stored in the ISBE. These operations include clipping, culling, perspective correction and viewport scaling operations. VPC 710 transmits processed vertex attributes to data crossbar (x-bar) 332. Data x-bar 332 is configured to distribute vertex attributes to circular buffers (CBs) 712. Data x-bar 332 is configured to store vertex attributes within any of the L2 caches on PP subsystem 112. VPC 710 receives a set of circular buffer entry pointers, referred to herein as "CBE pointers," that indicate the location of each vertex attribute stored in circular buffers 712.

VPC 710 also determines routing information for the graphics primitives. Each graphics primitive is routed to a raster unit that rasterizes graphics primitives and fragments of graphics primitives that overlap a particular region of the display. VPC 710 performs a bounding-box calculation with the graphics primitives to determine which region of the display each graphics primitive overlaps. VPC 710 transmits the graphics primitives and the CBE pointers used to identify the vertex attributes associated with the graphics primitives to WDX 330, along with the routing information. WDX 330 then transmits the graphics primitives and the CBE pointers to the relevant raster unit, such as raster unit 714. Raster unit 714 stores graphics primitives and the CBE pointers.

Raster unit 714 associates the received graphics primitives with the pixels processed by raster unit 714 to create a "tile." Raster unit 714 transmits the tile to the MPC 702. MPC 702 routes the tile to shader pipeline 706 within SM 704. Shader pipeline 706 performs sequential shading operations on the pixels in the tile to generate colorized pixels. These pixels are transmitted to texture unit 315 and ROP 360.

Texture unit 315 performs texture mapping operations, e.g., determining texture sample positions, reading texture data, and filtering the texture data. Texture data is fetched from memory via data x-bar 332 as needed. Texture unit 315 may be configured to store the texture data in an internal cache. In some embodiments, texture unit 315 is coupled to L1 cache 320, and texture data is stored in L1 cache 320.

ROP 360 is a processing unit that performs raster operations, such as stencil, z test, and the like, and outputs pixel data as processed graphics data. In some embodiments of the present invention, ROP 360 is configured to compress z or color data that is written to memory and decompress z or color data that is read from memory. Processed graphics data output by ROP 360 may be routed through data x-bar 332 to parallel processing memory 204, and/or system memory 104, for display on display device 110 or for further processing by CPU 102 or parallel processing subsystem 112. Graphics data may also be stored in in L1 cache 320 for further processing.

Figure 7:
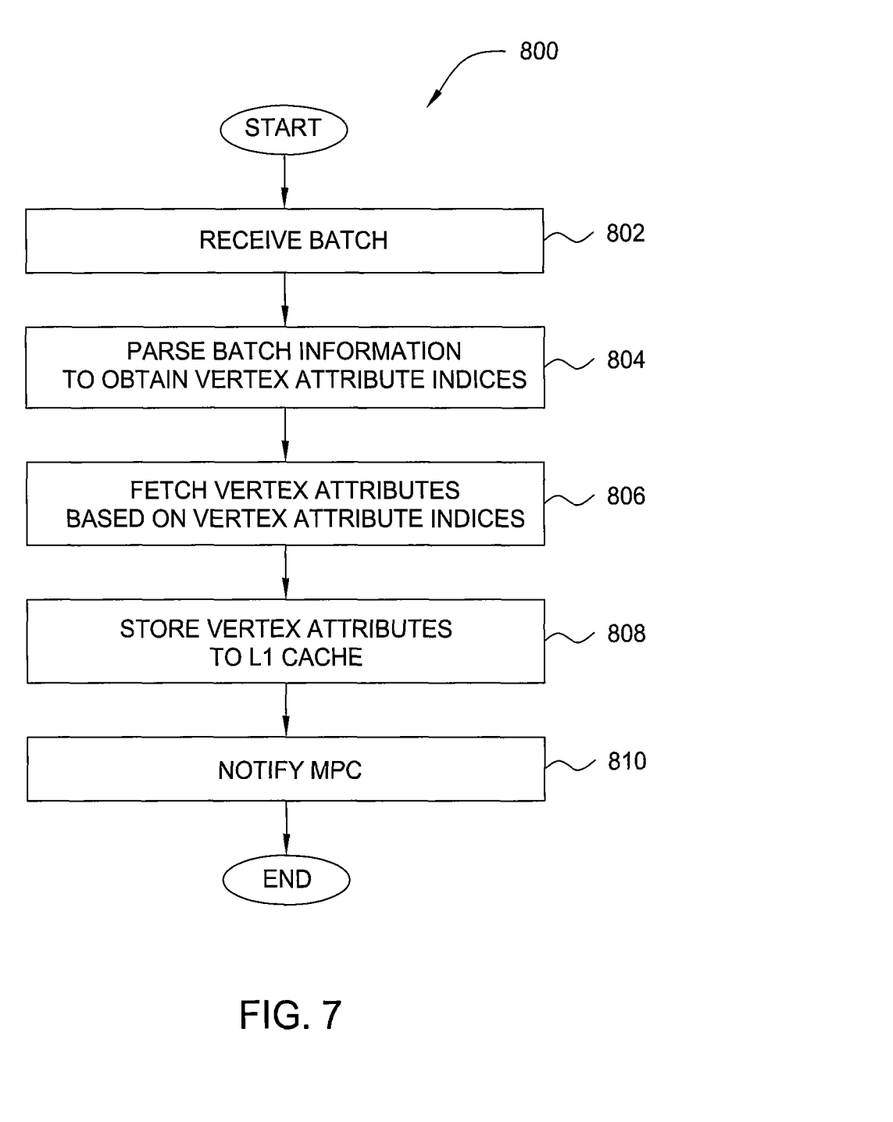
FIG. 7 is a flowchart of method steps for fetching vertex attributes, according to one embodiment of the present invention.

FIG. 7 is a flowchart of method steps for fetching vertex attributes, according to one embodiment of the present invention. Persons skilled in the art will understand that, even though the method 800 is described in conjunction with the systems of FIGS. 1-4 and 6, any system configured to perform the method steps, in any order, is within the scope of the present invention.

As shown, the method 800 begins at step 802, where pipeline manager 305 receives a batch of graphics data from WDU 200. Pipeline manager 305 also receives batch information specifying how primitive descriptions are stored in the batch. Pipeline manager 305 transmits the batch and batch information to MPC 702 on one of the SPMs 310. MPC 702 then transmits the batch and batch information to VAF 708.

At step 804, VAF 708 parses the batch and extracts vertex attribute indices from unique indices 616. The vertex attribute indices identify vertices and vertex attributes stored in vertex array 614. VAF 708 also parses the batch information and determines the encoding technique used to encode primitive descriptions in slot refs 618. VAF 708 may then extract primitive descriptions from the batch.

At step 806, VAF 708 fetches vertex attributes through data x-bar 332 using the vertex attribute indices. The vertex attributes are typically stored in one of a plurality of memory partitions accessible through data x-bar 332. Since the vertex attributes may be stored in different memory partitions, VAFs on different SPMs 310 may fetch vertex attributes simultaneously. The vertex attributes are stored in one or more vertex arrays 614, referred to hereinafter as "vertex attribute streams." In one embodiment, up to 32 vertex streams are enabled. For each vertex attribute stream, PD 604 computes a "base" address and a "stride" amount that are both represented in bytes. The base address and the stride amount are transmitted to all GPCs 208A-208N, and each VAF 708 on every SPM 310 receives this information. VAF 708 computes the address of a particular vertex attribute using the base, the stride and the index of the vertex attribute (extracted from PTC 610) according to the following equation: vertex attribute address=base+index*stride. Each vertex attribute stream corresponds to a different vector attribute, and so each vertex processed in VAF 708 results in vector attributes being fetched from all enabled vertex attribute streams. PD 604 provides a separate base/stride combination for each enabled vector attribute stream, though a common index extracted from PTC 610 is used to retrieve each vector attribute associated with a particular vertex. In one embodiment, the vertex attribute streams for different vector attributes can be interleaved and arranged in several different ways.

At step 808, VAF 708 stores the fetched vertex attributes and the extracted primitive descriptions in L1 cache 320. VAF 708 stores the fetched vertex attributes and the extracted primitive descriptions in an inter-stage buffer entry (ISBE). Once the ISBE is stored in L1 cache 320, the method 800 advances to step 810.

At step 810, VAF 708 notifies MPC 702 that the ISBE is stored in L1 cache 320. MPC 702 then initiates shader pipeline 706 with the data stored in L1 cache 320 and, when shader pipeline 706 is complete, transmits the processed data to VPC 710. The method 800 then terminates.

In sum, graphics data is grouped into N independent batches for parallel processing by N graphics processing sub-units. Each batch includes unique indices read from an index array. Each index points to a different entry in a vertex array. Each entry in the vertex array stores vertex attributes associated with a vertex. Each batch is transmitted to a different graphics processing sub-unit that parses the batch and fetches the vertex attributes associated with the batch.

Advantageously, each graphics processing subunit is configured to fetch vertex attributes concurrently. Additional graphics processing subunits may be added to increase the graphics processing throughput without incurring additional latencies associated with fetching vertex attributes. Additionally, the data bus over which batches are transmitted does not need to be as wide as an entire vertex, yet may transmit data associated with multiple vertices simultaneously. Furthermore, the amount of data transmitted to each sub-unit is reduced because indices are transmitted instead of vertex attributes.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for fetching vertex attributes for graphics processing, comprising:
receiving within a general processing cluster a data structure that includes a pointer, a unique index, and a primitive description, wherein the pointer identifies a location in the unique index, wherein the unique index identifies a plurality of vertices, wherein the primitive description describes a type of graphic that corresponds to the plurality of vertices, and wherein vertex attributes corresponding to the plurality of vertices are stored in a memory external to the general processing cluster;
parsing the unique index from the data structure within the general processing cluster;
fetching the vertex attributes corresponding to the plurality of vertices identified in the unique index from the memory external to the general processing cluster;
generating a buffer entry that includes the vertex attributes and a translated primitive description, wherein the translated primitive description comprises pointers to buffer locations; and
storing the buffer entry including the vertex attributes and the translated primitive description in a memory internal to the general processing cluster.

2. The method according to claim 1, further comprising:
reading the pointer and the primitive description from memory;
storing the pointer in a particular location within the data structure in such a manner that redundant pointers are not retained; and
storing the primitive description in the data structure as reference to the particular location of the pointer.

3. The method according to claim 2, wherein a set of consecutive vertex descriptions define a single primitive.

4. The method according to claim 1, further comprising:
parsing the data structure to obtain the pointer to the location in the unique index and
storing the buffer entry including the vertex attributes and the translated primitive description in a cache memory internal to the general processing cluster.

5. The method according to claim 4, further comprising initiating a shader pipeline unit included in the general processing cluster with the vertex attributes and the translated primitive description stored in the cache memory internal to the general processing cluster.

6. The method according to claim 4, further comprising notifying a shader pipeline unit of the general processing cluster that the vertex attributes have been fetched.

7. The method according to claim 1, wherein the graphics processing is carried out in a plurality of general processing clusters and the data structure is distributed to each of the general processing clusters.

8. The method according to claim 7, wherein the data structure is distributed to each of the general processing clusters in a round-robin fashion.

9. The method according to claim 1, wherein the data structure further includes information specifying the encoding technique used to encode the primitive descriptions.

10. A graphics processing system having a plurality of general processing clusters and a primitive distributor that generates a data structure and distributes the data structure to the general processing clusters, wherein each general processing cluster includes a shader multiprocessor and a vertex attribute fetch unit, wherein the vertex attribute fetch unit is configured to:
receive within a general processing cluster the data structure that includes a pointer, a unique index, and a primitive description, wherein the pointer identifies a location in the unique index, wherein the unique index identifies a plurality of vertices, wherein the primitive description describes a type of graphic that corresponds to the plurality of vertices, and wherein vertex attributes corresponding to the plurality of vertices are stored in a memory external to the general processing cluster;
parse the unique index from the data structure within the general processing cluster;
fetch the vertex attributes corresponding to the plurality of vertices identified in the unique index from the memory external to the general processing cluster;
generate a buffer entry that includes the vertex attributes and a translated primitive description, wherein the translated primitive description comprises pointers to buffer locations; and
store the vertex attributes and the translated primitive description in a memory internal to the general processing cluster.

11. The graphics processing system according to claim 10, wherein the data structure stores the pointer in a particular location within the data structure in such a manner that only unique pointers are stored therein and the primitive description in the data structure represents a reference to the particular location of the pointer within the data structure.

12. The graphics processing system according to claim 11, wherein each general processing cluster further includes a cache memory in which the vertex attributes fetched from memory are stored and a shader pipeline unit that reads the vertex attributes from the cache memory.

13. The graphics processing system according to claim 10, further comprising a work distribution unit coupled to the primitive distributor for receiving the data structure and distributing the data structure to each of the general processing clusters.

14. The graphics processing system according to claim 10, wherein the primitive distributor includes a first memory unit and a second memory unit, the first memory unit storing unique pointers to vertex attributes that are retrieved from memory and the second memory unit storing primitive descriptions.

15. The graphics processing system according to claim 14, wherein the primitive distributor generates the data structure when the first memory unit is full and a new, unique pointer to vertex attributes is retrieved from memory.

16. The graphics processing system according to claim 15, wherein the primitive distributor empties the first memory unit upon generation of a new data structure.

17. A non-transitory computer readable storage medium comprising instructions for a graphics processing system, wherein the graphics processing system executing the instructions carries out the steps of:
  receiving within a general processing cluster a data structure that includes a pointer, a unique index, and a primitive description, wherein the pointer identifies a location in the unique index, wherein the unique index identifies a plurality of vertices, wherein the primitive description describes a type of graphic that corresponds to the plurality of vertices, and wherein vertex attributes corresponding to the plurality of vertices are stored in a memory external to the general processing cluster;
  parsing the unique index from the data structure within the general processing cluster;
  fetching the vertex attributes corresponding to the plurality of vertices identified in the unique index from the memory external to the general processing cluster;
  generating a buffer entry that includes the vertex attributes and a translated primitive description, wherein the translated primitive description comprises pointers to buffer locations; and
  storing the buffer entry including the vertex attributes and the translated primitive description in a memory internal to the general processing cluster.

18. The computer readable storage medium according to claim 17, wherein the graphics processing system executing the instructions further carries out the steps of:
  reading the pointer and the primitive description from memory;
  storing the pointer in a particular location within the data structure in such a manner that redundant pointers are not retained; and
  storing the primitive description in the data structure as reference to the particular location of the pointer.

19. The computer readable storage medium according to claim 17, wherein the graphics processing system executing the instructions further carries out the steps of:
  parsing the data structure to obtain the pointer to the location in the unique index and
  storing the buffer entry including the vertex attributes and the translated primitive description in a cache memory internal to the general processing cluster.

20. The computer readable storage medium according to claim 19, further comprising initiating a shader pipeline unit included in the general processing cluster with the vertex attributes and the translated primitive description stored in the cache memory internal to the general processing cluster.

21. The computer readable storage medium according to claim 17, wherein the graphics processing system executing the instructions further carries out the step of notifying a shader pipeline unit of the general processing cluster that the vertex attributes have been fetched.

22. The computer readable storage medium according to claim 17, wherein the graphics processing system executing the instructions further carries out the step of distributing the data structure to a plurality of general processing clusters.

23. The computer readable storage medium according to claim 22, wherein the graphics processing system executing the instructions carries out the step of distributing the data structure to a plurality of general processing clusters in a round-robin fashion.

24. The computer readable storage medium according to claim 17, wherein the data structure further includes information specifying the encoding technique used to encode the primitive descriptions.

* * * * *